(12) United States Patent
Ringdal et al.

(10) Patent No.: US 10,753,684 B2
(45) Date of Patent: Aug. 25, 2020

(54) SYSTEM AND PROCESS FOR DRYING LOOSE BULK MATERIAL

(71) Applicant: FLOAT BIOPRO AS, Ålesund (NO)

(72) Inventors: Svein Inge Ringdal, Ålesund (NO); Kåre Mikal Mikalsen, Ålesund (NO)

(73) Assignee: FLOAT BIOPRO AS, Ålesund (NO)

( * ) Notice: Subject to any disclaimer, the term of this patent is extended or adjusted under 35 U.S.C. 154(b) by 93 days.

(21) Appl. No.: 15/999,057

(22) PCT Filed: Feb. 17, 2017

(86) PCT No.: PCT/NO2017/050042
§ 371 (c)(1),
(2) Date: Aug. 17, 2018

(87) PCT Pub. No.: WO2017/142421
PCT Pub. Date: Aug. 24, 2017

(65) Prior Publication Data
US 2019/0107327 A1    Apr. 11, 2019

(30) Foreign Application Priority Data

Feb. 19, 2016 (NO) .................................. 20160293

(51) Int. Cl.
*F26B 23/00* (2006.01)
*F26B 3/06* (2006.01)
(Continued)

(52) U.S. Cl.
CPC ............. *F26B 23/005* (2013.01); *F26B 3/06* (2013.01); *F26B 3/0923* (2013.01); *F26B 5/042* (2013.01);
(Continued)

(58) Field of Classification Search
CPC ........ F26B 23/005; F26B 17/32; F26B 5/042; F26B 21/086; F26B 3/06; F26B 21/02
See application file for complete search history.

(56) References Cited

U.S. PATENT DOCUMENTS 3,815,257 A * 6/1974 Freze ...................... D06F 58/02
34/129
4,444,553 A 4/1984 Christodoulou
(Continued)

FOREIGN PATENT DOCUMENTS

CN    201522181 U    7/2010
EP    0090261 A2    10/1983
(Continued)

OTHER PUBLICATIONS

Jun. 21, 2019 Extended European Search Report issued in European Patent Application No. 17753555.6.
(Continued)

*Primary Examiner* — David J Laux
(74) *Attorney, Agent, or Firm* — Arent Fox LLP (57) ABSTRACT

An energy efficient a drying system and process using heated, dry air. The system includes an air inlet, a heat pump evaporator unit, a heat pump condenser unit, a drying unit, a heat exchanger unit, a fan, and air channels for transport of airflow from the air inlet through the system. The fan causes air to flow into the air inlet through the heat pump evaporator unit and to maintain an airflow through the system. The heat pump evaporator unit is configured to use a refrigerant to absorb heat from air that flows into the system through the heat pump evaporator unit. The heat pump condenser unit is configured to release the heat absorbed at the evaporator to the airflow. The heat exchanger
(Continued)

unit is arranged to transfer heat from the airflow leaving the drying unit to the cold, dehumidified air flowing from the heat pump evaporator unit.

17 Claims, 7 Drawing Sheets

(51) Int. Cl.
*F26B 3/092* (2006.01)
*F26B 5/04* (2006.01)
*F26B 17/32* (2006.01)
*F26B 21/08* (2006.01)

(52) U.S. Cl.
CPC ............ *F26B 17/32* (2013.01); *F26B 21/086* (2013.01); *Y02B 30/52* (2013.01); *Y02P 70/405* (2015.11)

(56) References Cited

U.S. PATENT DOCUMENTS

| | | | |
|---|---|---|---|
| 4,532,720 A | 8/1985 | Uchida | |
| 4,603,489 A * | 8/1986 | Goldberg | ................ D06F 58/02 34/605 |
| 9,091,015 B2 * | 7/2015 | Caldeira | ............... D06F 58/206 |
| 2005/0066538 A1 * | 3/2005 | Goldberg | ................ D06F 25/00 34/218 |
| 2013/0160970 A1 | 6/2013 | Takubo | |

FOREIGN PATENT DOCUMENTS

| | | |
|---|---|---|
| EP | 2024701 A1 | 2/2009 |
| GB | 1080605 A | 8/1967 |
| GB | 2 064 099 A | 6/1981 |
| GB | 2 186 959 A | 8/1987 |
| WO | WO 93/21489 A1 | 10/1993 |
| WO | WO 98/22765 A1 | 5/1998 |
| WO | WO 2015/029065 A2 | 3/2015 |
| WO | WO 2016/128849 A1 | 8/2016 |

OTHER PUBLICATIONS

European Standard Series EN15234, Part 4 (EN15234-4:2012), "Solid biofuels—Fuel quality assurance; Part 4: Wood chips for non-industrial use", 2012.
European Standard Series NS-EN 14774. Part 2 (NS-EN 14774-22009), "Solid biofuels—Determination of Moisture Content—Oven Dry Method—Part 2: Total Moisture—Simplified Method", 2009.
European Standard Series NS-EN ISO 17225, Part 1 (NS-EN ISO 17225-1-2014), "Solid biofuels—Fuel specifications and classes, Part 1: General Requirements", 2014.
Helin, M. "Wood as a fuel & drying of wood chips", 2005. North Karelia Polytechnic, Finland.
International Search Report and Written Opinion dated Jun. 29, 2017 issued in International Application No. PCT/NO2017/050042.
Norwegian Search Report dated Sep. 18, 2016 issued in Nomegian Application No. 20160293.

* cited by examiner

SYSTEM AND PROCESS FOR DRYING LOOSE BULK MATERIAL

CROSS-REFERENCE TO RELATED APPLICATIONS

This application is a 35 U.S.C. § 371 National Phase of PCT Application No. PCT/NO2017/050042 filed Feb. 17, 2017, which claims priority to Norwegian Application No. NO 20160293 filed Feb. 19, 2016. The disclosures of these prior applications are hereby incorporated by reference herein.

FIELD OF THE INVENTION

The invention relates to an energy efficient drying system for lowering the moisture in materials and products using heated dry, air flow. The invention also concerns a method for lowering the moisture in materials using the drying system.

BACKGROUND OF THE INVENTION

Drying is used in a variety of industries such as agricultural, marine products, timber, textile, chemical, paper, etc. Drying is typically performed by keeping the products at a high temperature, approximately 60° to 80° C., for a long time. Drying is an energy-intensive process and optimization of systems and processes to achieve more cost-effective drying processes will result in significant reduction of energy consumption, which may provide considerable cost savings.

In conventional systems for drying, i.e. kilning apparatus, the drying air is directly heated by using oil or gas burners. Thus, in addition to reducing the energy consumption in drying systems, there is also a desire that such systems should be environmentally friendly, with no or minimal emissions of combustion products originating from the burning of fossil fuels.

Other conventional drying systems comprise dehumidifiers, heaters and heat exchangers. U.S. Pat. No. 4,532,720 relates to a drying process and apparatus utilizing a refrigeration cycle. The drying apparatus is constructed to interpose a heat exchanger between an evaporator and a heater so that air in a drying chamber may be dried and heated in a cycle of introducing hot air in the drying chamber into the heat exchanger to pre-cool hot air, guiding pre-cooled air to the evaporator to dry it due to dehumidification by cooling, introducing cooled and dried air into the heat exchanger again to increase the temperature, introducing the air to the heater to further heat it and returning dried and heated air to the interior of the drying chamber. The heater is a condenser and an electric heater, providing hot air to the drying chamber keeping the drying chamber at a high temperature of about 60-80° C. In the system described in U.S. Pat. No. 4,532,720 the air from the drying chamber is recycled to the dehumidifier in a closed circulation system. This is a normal design for such drying apparatus.

The growing demand for renewable energy sources has led to an increased focus on bioenergy resources. The use of forest resources for bioenergy is therefore expected to increase considerably. The prevailing use of biofuel is the direct combustion of wood, wood chips and pellets for heating in stationary plants, either in conventional wood stoves, central heating systems or remote heating plants. Different wood chips heating installations require different moisture content in the wood. Some heating installations have optimal efficiency at moisture content below 30%, while others may require 40-50%. Dry wood chips will give a complete combustion with lesser emissions and provide better effect on the boiler. Trees on root normally have a moisture content of approximately 50% of the total weight, meaning half the weight of the tree is water and the rest is dry matter. Thus, the use of forest resources as bioenergy involves drying and intermediate storing of the energy wood chips.

The European standard series EN 15234, "Solid biofuels—Fuel quality assurance" is provided as general requirements and additional product standards, and consists of 6 Parts. Part 4: Wood chips for non-industrial use (EN 15234-4:2012) covers the raw material supply, production and delivery chain. The said part defines inter alia dimensions for wood chips, specifying P-classes defining particle sizes, size fractions and dimensions, e.g. in class P16 the main fraction (at least 75% of the total mass) must be between 3.15 and 16 mm. Particles smaller than 3.15 are defined as fines fraction and this amount must be less than 12 weigh-%. The sizes/dimensions for the coarse fraction are also defined. Other P-classes are P31.5: at least 75 weight-% is between 8-31.5 mm; P45: at least 75 weight-% is between 8-45 mm; and P65: at least 75 weight-% is between 8-63 mm.

M. Heling (in Helin, M., "Wood as a fuel & drying of wood chips", 2005, North Karelia Polytechnic, Finland) gives an example which illustrates the effect of correct moisture in the wood chips. The amount of heat out of 1 loose-$m^3$ of wood chips with two different moisture contents using a 50 kW boiler:

Moisture content 50%, net heating value≈800 kWh/loose-$m^3$.

The boiler efficiency at 50% moisture is≈62%.

The available energy (heat) is 0.62×800 kWh≈500 kWh.

Moisture content 30%, net heating value≈890 kWh/loose-$m^3$.

The boiler efficiency at 30% moisture is≈78%.

The available energy (heat) is 0.78×890 kWh≈700 kWh

Using wood chips with 30% moisture instead of 50% moisture will thus result in 40% more heating energy in a 50 kW boiler.

Most small-scale and medium sized wood chips heating installations have optimal combustion at moisture content of 20-25%. In production of pellets and wood powder for gasification the requirement is 10-12% moisture. Traditional drying of wood chips involves storing logs for drying in cold open air or covered until moisture content in the logs is about 30%, before wood-chipping. The time for such drying is however very long. In general, the moisture content in storage stable wood chips should be less than about 25% since higher moisture content will increase the risk of heat generation in the stored wood chips, and in the worst case spontaneous ignition. The cost for artificial drying may be high compared to the gain of energy in the dried wood chips. Thus, there will be a positive energy balance only if the energy used for artificial drying the wood chips is less than the resulting energy content in the wood chips. Economical methods for drying wood chips may involve usage of waste heat from the process industries, incinerations plants or power plants. However, when there is no such waste heat available, the drying of wood chips must be carried out by lowest possible consumption of supplied energy in the form of electrical power or other energy source.

With reference to the prior art drying systems there is a desire to provide a drying system and a drying method that significantly reduces the energy consumption, shortens the time for the drying process and results in uniform drying of the products to be dried, compared to conventional drying systems. Such drying system should be equally suitable for drying different kinds of materials and products, generally divided in loose bulk materials and single piece products. Further, the drying system should be suitable for drying products which are temperature sensitive, which is often the case when drying food products. Some traditionally prepared food products is dependent on a certain climate, e.g. for drying fish the temperature must neither be too low or too high. The recent climate changes leads to challenges for such traditional methods. Thus, there is also a desire for a drying system which can be used in the production of such food products.

The present inventors found that when utilizing the heat (energy) at both the cold and the warm side of a heat pump, while controlling the air conditions throughout the drying system, very good results are achievable with regards to the above said desired properties. The inventors surprisingly found that providing dry, only moderately heated air into a drying chamber resulted in a very effective drying process both in reducing the drying time and in energy consumption per weight of dried product. Keeping the drying temperature in the drying chamber at a moderate level, i.e. 20-35° C., means that all required heat may be provided by a conventional (air-to-air type), e.g. heat pump for domestic use, or in larger drying apparatus a large industrial air-to-air heat pump.

A heat pump provides heat in a very efficient way compared to using the same amount of power by heating with a panel (electrical) heater. The performance of a heat pump is given by the term, coefficient of performance (COP), which is used to describe the ratio of useful heat movement per work input. At outside temperature of e.g. 10° C. a typical air-source heat pump has a COP of 3 to 4, at optimal conditions a COP of 5 may be achieved.

The present inventors found that by passing a slightly heated, dry airflow through or past moist material a large amount of humidity is taken up by the drying air. By passing the air leaving the drying chamber through a heat exchanger in thermal communication with cold, dry air flowing into the drying system, it is possible to recover most of the heat. The present inventors found that by combining these findings in an optimal system, wherein the air atmosphere and pressure are controlled, it is possible to attain a drying system which utilizes the supplied energy optimally, resulting in a very cost effective method for drying material. Using the drying system according to the present invention resulted in a reduction 50% less energy consumption (power consumption) compared to a conventional "modern" dryer which recycles the drying air to recover heat. Also, the drying system according to the present invention reduces the drying time by 50% compared to the said conventional modern dryer. Compared to other conventional dryers (without recycling drying air) resulted in up to 75% reduction in power consumption. Thus the present invention results in considerable savings in costs, energy consumption and time. It also has the possibilities of scaling up or down with regards to the amounts of materials to be dried. Another advantage of the present invention in relation to known drying system is that the present system eliminates the need for a separate air dehumidifier. The drying system according to the present invention also eliminates the need of an extra heater, as the heat demand is covered by the heat pump.

The present drying system can be used for drying loose bulk materials and single piece materials/products. In this context, loose bulk material refers to materials in granular or particular form or a mass of relatively small solids. Examples of loose bulk materials are grains (wheat, malt, maize, rice, barley, oats, rye, sorghum, soybeans, etc.), wood chips, and agricultural products like fruits which must be dried during processing. Further, the term "single piece materials/products" should be understood as products/materials which are not considered bulk materials, but handled individually, or only a few at the time. Examples of such products are fish products, meat products, vegetables or fruits, wood products, marine products, etc.

In this context the expressions "drying", "dehumidifying" and "lowering the moisture" are used interchangeably and should have the same meaning unless explicitly otherwise stated.

SUMMARY OF THE INVENTION

In a first aspect the present invention provides a drying system for lowering the moisture content in materials by using heated, dry air, the system comprises an air inlet through a heat pump evaporator unit, a heat pump condenser unit, a drying unit, a heat exchanger unit, a fan and air channels for closed transport of an airflow from the air inlet through the system, wherein the fan is arranged to cause air to flow into the air inlet through the heat pump evaporator unit and to maintain an airflow through the system;

the heat pump evaporator unit is at least partly encased, the evaporator includes a refrigerant absorbing heat from the surrounding air of which a portion flows into the system through the heat pump evaporator unit, thereby producing a cold and dehumidified air flow;

the heat pump condenser unit is encased defining a volume in which the refrigerant releases the heat absorbed at the evaporator to the airflow, producing a heated, dry airflow which is introduced to the drying unit; and the heal exchanger unit is arranged to transfer heat from the airflow leaving the drying unit to the cold, dehumidified air flowing from the heat pump evaporator unit.

In a first embodiment air channels are provided between each unit (i.e. the heat pump evaporator unit, the heat pump condenser unit, the drying unit and the heat exchanger unit), thereby ensuring closed transport of the air flowing through the system. The airflow is transported in channels from the air inlet through the heat pump evaporator, throughout the drying system and discharged to the surroundings after leaving the heat pump downstream the drying unit. The air channels may be thermally insulated.

The air flowing into the drying system is preferably ambient or surrounding air. The present drying system may be used at normal temperatures, outdoor and indoor. The performance of the system is especially good when the temperature of the ambient/surrounding air is between about 5 to about 20° C., while surrounding air temperature range of 8-12 may enable the heat pump to be operated in a temperature range providing the best COP. If the ambient temperature is high, i.e. more than about 20° C. e.g. during the summer months or in warmer climates, the air provided to the air inlet and heat pump evaporator unit may be cooled, e.g. by using a water cooler or a sea water cooler. If the temperature of the ambient or surrounding air is low, e.g. during the winter months, the airflow leaving the heat exchanger, downstream the drying chamber, may be guided to the air inlet and heat pump evaporator unit.

The heat pump condenser unit, wherein the heat absorbed by the refrigerant in the evaporator is released to the airflow, lifts the drying air temperature up to about 35° C., before the air is passed to the drying unit. Heating the drying air to a temperature between 20-30° C., or 20-25° C. will normally result in a very energy efficient drying process, both with regards to drying time and power consumption.

In a second embodiment the drying unit may comprise at least one compartment with at least one inlet for receiving and distributing the heated, dry airflow, at least one drying chamber containing/holding the material to be dried, and at least one airflow outlet.

In third embodiment the drying unit is a pipe comprising an stationary outer pipe comprising a first end wall and a second end wall, at least one of the end walls have an opening for charging the moist material, and a side wall with at least one opening for inlet of the heated, dry air, the drying unit further comprises a rotatable drying chamber coaxially arranged inside the outer pipe, having a smaller diameter than the inner diameter of the outer pipe, and the side wall of the rotatable drying chamber is at least partially perforated, wherein the space defined between the inner side wall of the outer pipe and the rotatable drying chamber defines at least one compartment for receiving and distributing the heated, dry air, and an inner (central) chamber coaxially arranged inside the said rotatable drying chamber, the inner chamber has at least one opening in the side wall, for receiving air from the drying chamber, and discharging (evacuating) the airflow via at least one pipe arranged in one of the end walls of the outer pipe. The drying unit according to the third embodiment is particularly suitable for drying loose bulk materials.

Charging and discharging of the material into the drying unit according to the third embodiment may be done through the same opening provided in one of the end walls. In another embodiment the charging of the moist material is done via an opening in one of the end walls and discharging of the material is done via a second opening in the opposite end wall.

The outer pipe may be divided in two or more sections, dividing the said at least one compartment into two or more compartments, or an equal number of compartments corresponding to the number of outer pipe sections, and each of the said sections have at least one inlet for drying air, preferably one inlet arranged on each opposite side wall of the pipe sections.

The inner chamber may be divided in two or more inner chamber sections by means of partition wall(s), and where a pipe for discharging (evacuating) the airflow extends from each said inner chamber section through one of the end walls of the outer pipe. The in inner chamber side wall may be at least partially perforated.

The drying unit may be tilted by elevating one end, thereby facilitating filling, distributing and discharging of the loose bulk material.

In a fourth embodiment the drying unit may be a tunnel, or a housing into which the warm, dry air is distributed. The materials to be dried may be placed on mesh trays, or mesh shelfs or any other design for holding the material allowing the airflow to pass. The trays or shelfs holding the material may be fixed, removable (e.g. sliding and held in a slot). The trays/shelfs holding the material may also be provided on a transporting means, thus being transported through the drying unit.

In a fifth embodiment the drying unit may be a chamber divided in several sub chambers through which the drying air may flow successively, e.g. in a labyrinth manner. The material to be dried may be held by mesh trays, or mesh shelfs or any other design for holding the material allowing the airflow to pass.

The drying units according to the fourth and fifth embodiments are especially suitable for drying single piece products.

The drying system according to the present invention may be operated continuously, semi-continuously or batchwise. The drying unit may comprise sensors for measuring temperature and/or relative humidity for surveying the progress of the drying process.

In a second aspect the invention concerns a process for lowering the moisture content in a material by the use of the drying system according to the present invention.

The process for lowering the moisture content in a material by the use of heated, dry airflow, comprises
  providing an airflow into an air inlet through a heat pump evaporator unit containing a refrigerant, the refrigerant absorbing heat from the air, thereby producing a cold, dry airflow,
  passing on the cold, dry airflow from the heat pump evaporator unit to a heat exchanger unit, and further to a heat pump condenser unit, in which the heat absorbed by the refrigerant is released, thereby producing a heated, dry airflow,
  passing on the heated, dry airflow to a drying unit containing the material to be dried,
  passing on the air from the drying unit to the heat exchanger, thereby transferring heat to the cold, dry airflow.

During the drying process the air is transported by air channels, airtight fitted to the units, thus allowing a closed transport of air from the air inlet at the heat pump evaporator unit, throughout the system, and releasing the air to the surrounding after being passed through the heat exchanger downstream the heating unit. The process may be used for drying loose bulk material of single piece materials as previously described. The drying process may be continuous, semi-continuous or batch.

In a third aspect the invention concerns a drying unit for drying material, especially suitable for drying loose bulk material, by using an airflow, comprising a stationary outer pipe comprising a first end wall and a second end wall, at least one of the said end walls have an opening for charging the loose bulk material, and a side wall with at least one opening for supplying drying air; a rotatable drying chamber coaxially arranged inside the outer pipe having a smaller diameter than the inner diameter of the outer pipe, and the side wall of the rotatable drying chamber is at least partially perforated, wherein the space defined between the inner side wall of the outer pipe and the rotatable drying chamber defines at least one compartment for receiving and distributing the drying air, and an inner (central) chamber coaxially arranged inside the said rotatable drying chamber the inner chamber has at least one opening in the side wall, for receiving air from the drying chamber, and discharging (evacuating) the airflow via at least one pipe arranged in one of the end walls of the outer pipe.

Charging and discharging of the material into the drying unit according to the third embodiment may be done through the same opening in one of the end walls. In another embodiment the charging of the moist material is done via an opening in one of the end walls and discharging of the material is done via a second opening in the opposite end wall.

The outer pipe may be divided in two or more sections, dividing the said at least one compartment into two or more compartments, or an equal number of compartments corresponding to the number of outer pipe sections, and each of the said sections have at least one inlet for drying air, preferably one inlet arranged on each opposite side wall of the pipe sections.

The inner chamber may be divided in two or more inner chamber sections by means of partition wall(s), and where a pipe for discharging (evacuating) the airflow extends from each said inner chamber section through one of the end walls of the outer pipe. The inner chamber side wall may be at least partially perforated.

In an embodiment the drying unit is arranged in a frame structure with means for elevating one end.

In an embodiment the drying unit is equipped with sensors for measuring temperature and/or relative humidity. The drying unit may be operated continuous, semi-continuous or batch.

In a specific embodiment the drying system according to the present invention comprises a heat pump, including an outdoor part (evaporator), an indoor part (condenser) and refrigerant fluid cycle, a heat exchanger, a fan, and a drying chamber.

The said outdoor part is at least partly encased, while the indoor part is fully encased. All units are provided with fitted connections to air channels. Air channels are provided between the heat pump outdoor part partial encasement and the heat exchanger (upstream the drying unit), between the heat exchanger and the encasement surrounding the heat pump indoor part, further between the encasement surrounding the heat pump indoor part and the drying unit, between the drying unit to the heat exchanger (downstream the drying unit) By this arrangement a closed transport of the air flowing through the system is ensured.

In a specific embodiment of the process the fan generates an airflow through the drying system. The air admission is through the partly encased heat pump outdoor unit radiator, through which the air flows and thereby is cooled and thus dehumidified, producing a cold, dry airflow. The cold, dry air flows via air channels to the heat exchanger, in which the cold dehumidified air is preheated by heat exchanging with the relatively warm and humid air coming from the drying unit, thereby recovering heat and latent heat by condensing the said humid air. The dry, preheated air is passed via an air channel to the encased heat pump indoor part, where the preheated, dry air is heated before being channeled to the drying unit. The warm, dry air is introduced and distributed via perforated plates and/or walls into the drying chamber holding the material to be dried. By this arrangement the heated, dry air is evenly distributed throughout the drying chamber and the materials to be dried. The airflow is collected after passage through the drying chamber and discharged from the drying unit via at least one outlet, and further channeled to the heat exchanger. After being heat exchanged the airflow is discharged to the surroundings.

BRIEF DESCRIPTION OF THE DRAWINGS

FIG. 3b shows the interior of the embodiment in FIG. 3a.

DETAILED DESCRIPTION OF PREFERRED EMBODIMENTS

An object of the present invention is to provide a cost and time efficient drying system and process for drying different sorts of materials. In the drying system according to present invention as much as possible of the heat supplied to the system is recovered, with minimal heat loss during the drying process.

The above said object is achieved by means of a drying system for lowering the moisture content in materials by using heated dry air, the system (schematically illustrated in FIG. 1) comprises an heat pump evaporator unit 1, an heat pump condenser unit 2, a drying unit 3, a fan 14 and a heat exchanger 4, wherein the heat pump evaporator unit 1 contains a refrigerant 21 absorbing heat from the air 22 surrounding the heat pump evaporator and from air flowing into the system at the air inlet through the heat pump evaporator unit 1, the heat pump condenser unit 2 releases the heat absorbed by the refrigerant 21 in the evaporator, and the heat exchanger 4 is arranged to transfer heat from the airflow discharged from the drying unit to the airflow 8 coming from the air inlet through the heat pump evaporator unit 1.

The drying system and drying process according to the present invention implies drying moist material with dry, moderately heated air by exploiting both the cold side and the warm side in a heat pump. The heat pump evaporator unit 1 is a heat pump outdoor unit, see FIG. 2. The heat pump evaporator unit 1, i.e. the heat pump outdoor unit, is at least semi-encased, e.g. in a cabinet, leaving the front of the heat pump outdoor part (radiator) open to the surrounding air, while confining a volume into which the air entering the system flows. As heat is transferred from the air flowing into the system to the refrigerant 21 in the evaporator, all air flowing into the system will be cooled and as a consequence some of the humidity in the air is condensed. Thus, the heat pump outdoor unit functions as an air dehumidifier, eliminating the need of a separate air dehumidifier in the system according to the invention. Conventional drying systems include dehumidifiers that require power supply. The present invention using the heat pump outdoor unit for this purpose results in an even more effective drying process, compared to previously known system.

Figure 2:
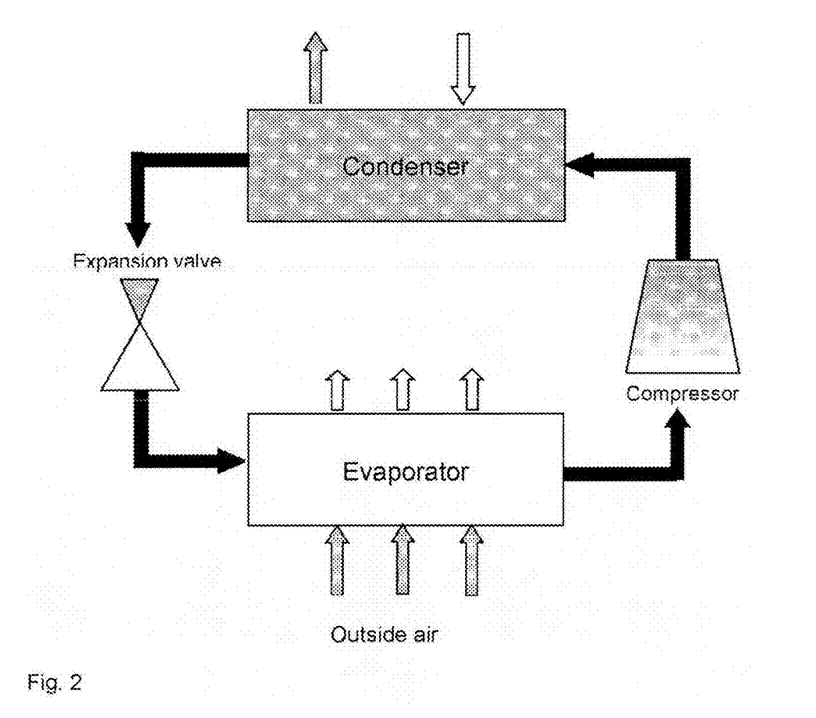
FIG. 2 illustrates in general a heat pump's vapor-compression refrigerator cycle.

The heat pump condenser unit 2 is a heat pump indoor unit. The said indoor unit is fully enclosed in a cabinet, defining a volume through which the air flows while being heated. The cabinet enclosing the said heat pump indoor unit may be any kind of case or box building-in the unit, and should have closable access doors. The evaporator and condenser are part of the refrigerator cycle 21 in the heat pump, the refrigerator cycle 21 further comprises an expander and compressor, as illustrated in FIG. 2.

Figure 1:
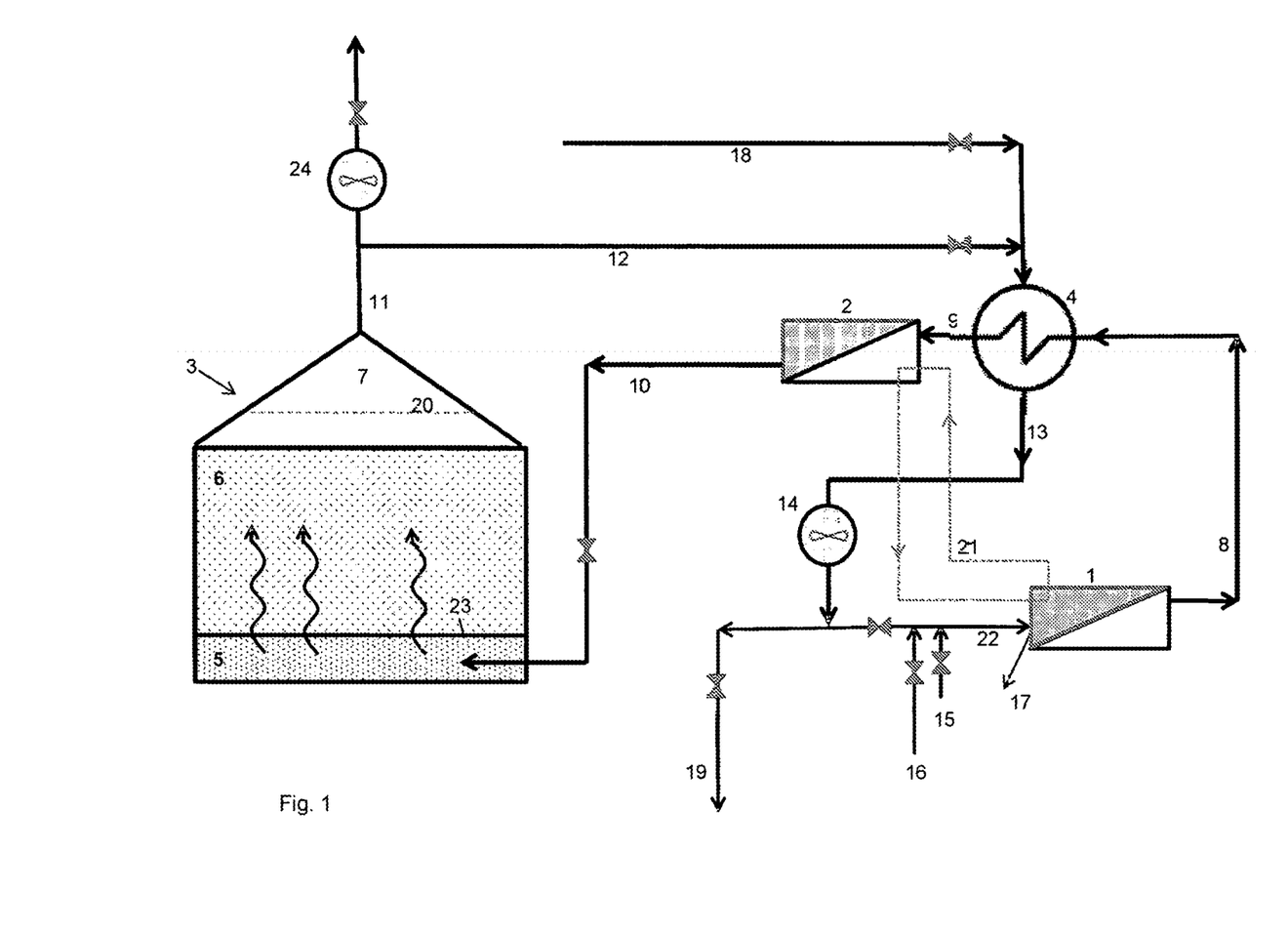
FIG. 1 is a schematic diagram illustrating the system according to the present invention.

The schematic diagram in FIG. 1 illustrates the drying system. The drying air flows through the system, i.e. between the units in the system, in conduits, ensuring a closed and controlled transport of the air flow from the air inlet, throughout the system and through the heat exchanger downstream the drying unit where the air is discharges to the surroundings. The conduits are preferably thermally insulated thereby minimizing heat loss. The drying system comprises a fan, lowering the pressure in the drying system and causing air to flow into and throughout the system. The fan may be any type of fan or blower which may be arranged to cause the air to flow into the system and throughout the system, e.g. a suction fan, an axial-flow fan or centrifugal fan, and is in this context generally referred to as "fan". The fan may be integrated in the heat exchanger unit 4, or any other appropriate location in the system maintaining the function of the fan. The inventors found that lowering the pressure in the drying system below normal pressures results in a more effective drying process As ambient/surrounding air 15 enters the air inlet through the heat pump evaporator unit 1 the air 22 passes through the evaporator radiator/coils of a heat pump outdoor unit (see FIG. 2), and the air thus becomes cooled. The heat pump evaporator unit 1 is at least partly enclosed in a cabinet, limiting a volume into which the air enters the drying system. By this arrangement all air flowing into the system will be cooled by the refrigerant in the evaporator. At normal conditions with ambient temperatures about 5-20° C., the temperature of the air passing the evaporator is lowered by about 3-5° C., and as a consequence the humidity in the air will condense 17. It is generally known that when air is cooled to temperatures below the dew point, the humidity in the air condenses. The air 8 flowing from the heat pump evaporator unit 1 is thus cold and relatively dry.

The cold, dry air 8 leaving the heat pump evaporator unit 1 is passed to the heat exchanger 4 in which the cold, dry air is pre-heated by recovering heat from the airflow 12 discharged from the drying unit 3. The pre-heated, dry air 9 is further conducted to the heat pump condenser unit 2, wherein the temperature of dry pre-heated air 9 is lifted by condensing of the refrigerant, resulting in a moderately heated, dry air flow 10, which is passed into the drying unit 3 and through/past the material to be dried. As the heated, dry air 10 has a deficiency of humidity, and has a relatively low pressure, its capacity to absorb moisture from the moist material is very high.

The temperature of the air 11 leaving the drying unit 3 increases as the drying process progresses while the humidity decreases. This heat is recovered by passing the said air 11/12 into the heat exchanger 4, wherein 85% of the heat is typically recovered. After being heat exchanged, the air 13 may still possess some residual heat. If the ambient temperature is low, e.g. considerably lower than the temperature in the air 13 leaving the heat exchanger, the air 13 from the heat exchanger may be guided towards the heat pump evaporator unit 1, and mixed with ambient air 15 providing more heat to be transferred to refrigerant in the evaporator, thus the remaining 15% heat may also be at least partially recovered. Other sources of warm air 16 may also be guided to the heat pump evaporator, e.g. from ventilation systems. By this arrangement as much as possible of the remaining heat is recovered, resulting in an extremely energy-efficient drying process.

During startup of a drying process the airflow discharged from the drying unit 3 can be relatively cold and humid. Thus, during the startup the air from the drying unit 3 may be ventilated directly to the surrounding by the use of fan 24, instead of being introduced into the heat exchanger. During said startup surrounding air 18 may instead be introduced into the heat exchanger 4 for pre-heating the cold, dry airflow 8.

The present system comprises a drying unit 3, a heat pump comprising an evaporator and a condenser, a heat exchanger 4, and a fan 14 driving the air flow throughout the system. The system comprises at least one of each said units, i.e. each drying unit 3 is associated with at least one heat pump, at least one heat exchanger and at least one fan. It is possible to include a different number of each unit in the system, and units may be arranged in series and/or parallel, e.g. 2, 3, 4 or even more of one or more units. Each heat pump and/or heat exchanger and/or fan may be connected to more than one drying unit, e.g. 2-4 drying units. Utilizing more than one heat pump, heat exchanger and fan may result in shorter drying time, however, the energy consumption will be higher when operating several such units. The number of units in the system should therefore be balanced and optimized to obtain the most energy efficient system.

Figure 3A:
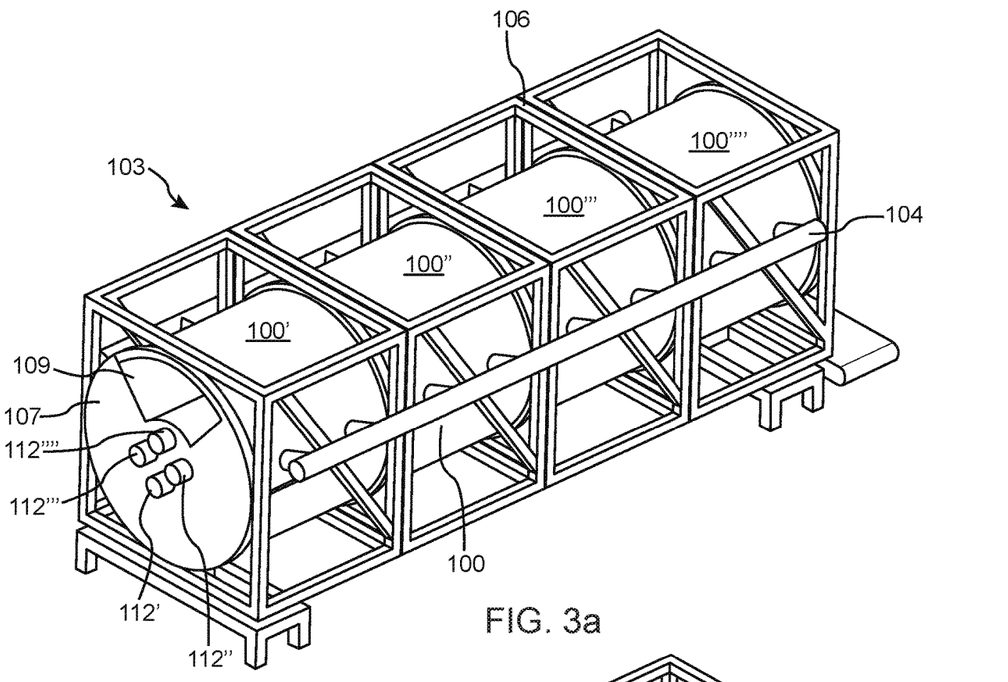
FIG. 3a shows an embodiment of the drying unit according to the present invention.
Figure 3B:
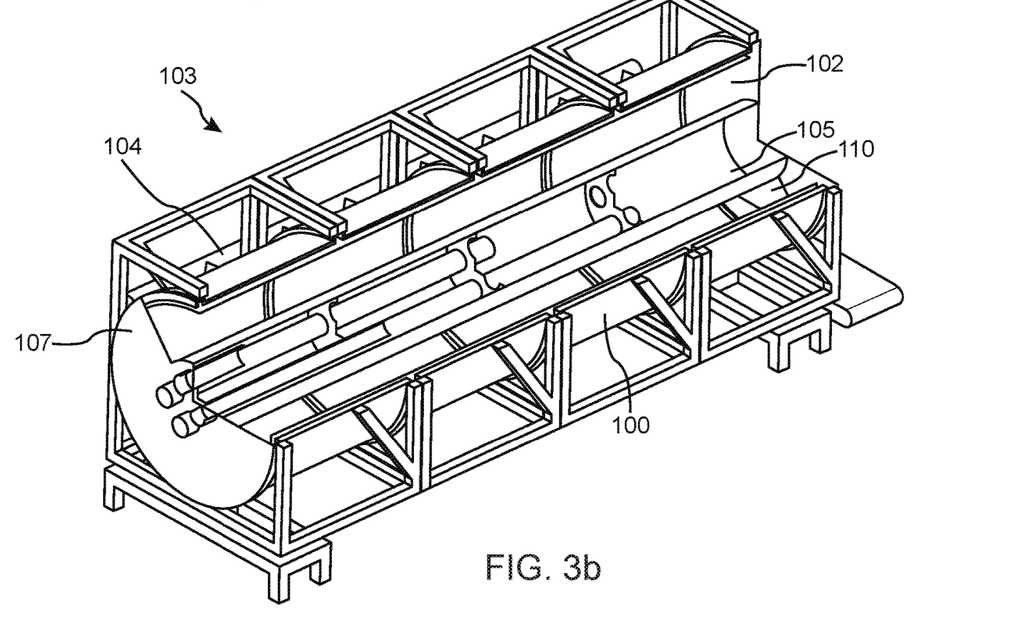
Figure 4A:
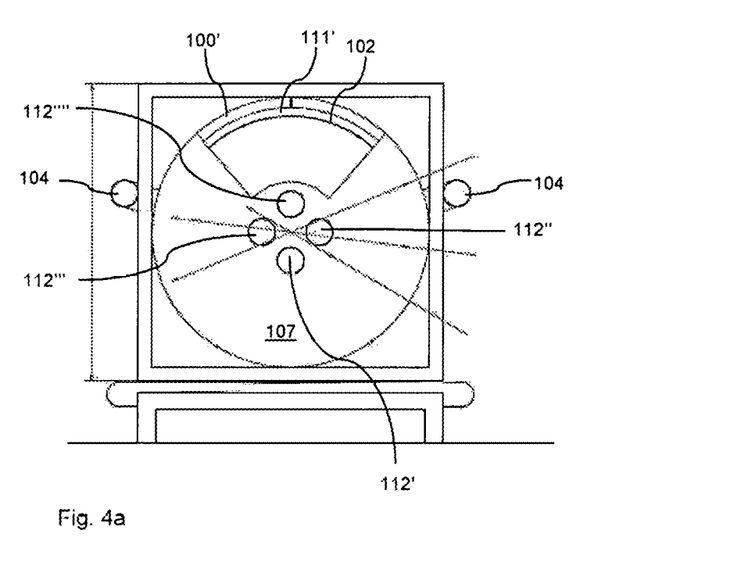
FIG. 4a-c illustrates an end view, an outer side view and a section C-C of the side view from above, of an embodiment of the drying unit according to the present invention.
Figure 4B:
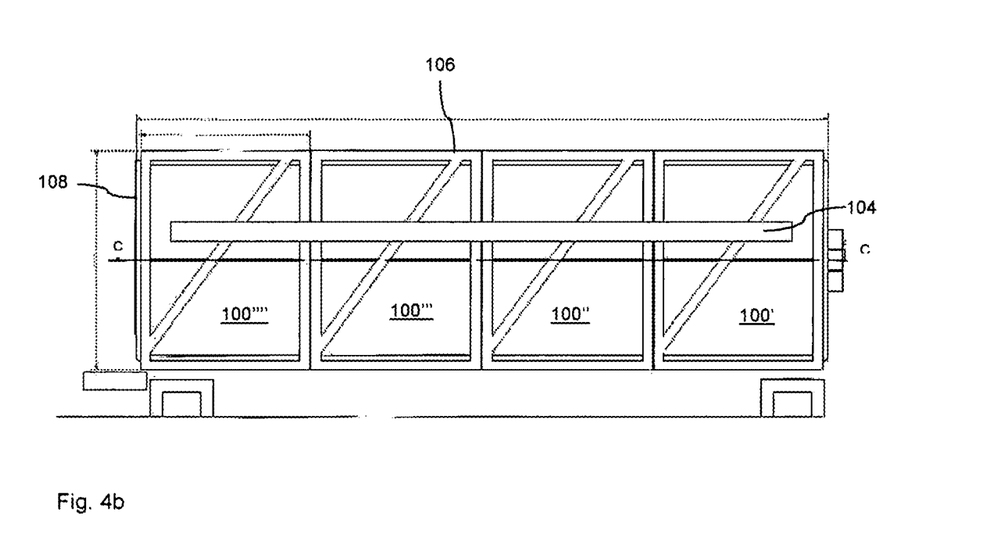
Figure 4C:
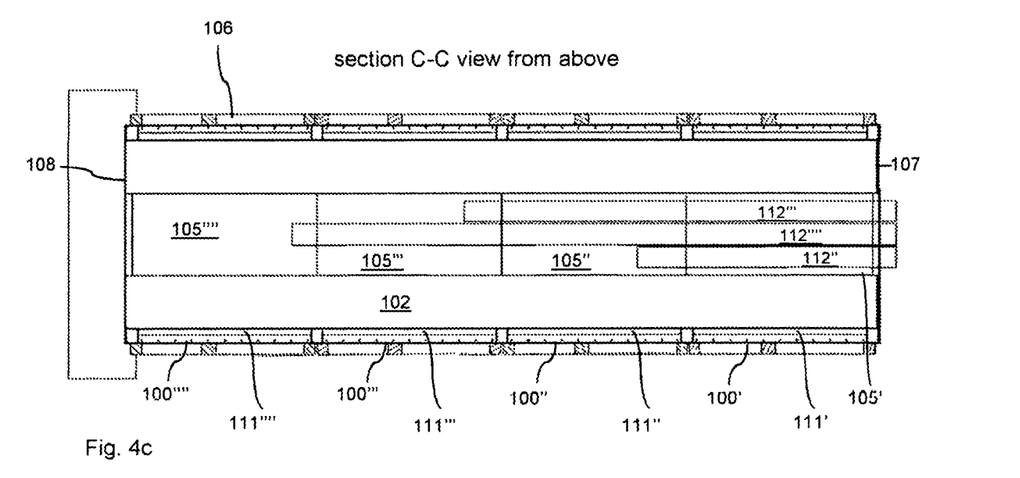

In an embodiment the drying unit 103 is a pipe or drum, see FIG. 3-4, especially suitable for drying loose bulk materials. FIGS. 3-4 only shows the drying unit 103, however the system comprises the other units, i.e. heat pump evaporator unit 1, heat pump condenser unit 2, heat exchanger unit 4 and fan 14, as previous described and schematically shown in FIG. 1, and the numerals in FIG. 1 will be referred to. The drying unit 103 according to the embodiment in FIG. 3-4 comprises an outer pipe 100 with end walls 107, 108 at each opposite end, the end walls are provided with openings/hatches 109, 110 for respectively loading/charging wet loose material and discharging/emptying dried loose material. Inside the outer pipe 100 a chamber 102 containing/holding the loose bulk material to be dried is coaxially arranged. The chamber 102 is a tumbler with perforated side wall. The chamber 102 is rotatable and may be rotated during the entire drying process, periodically or occasionally, e.g. at predefined time intervals to prevent formation of air channels through the loose bulk material during the passage of dry warm air.

The diameter of the chamber 102 containing the loose material is smaller than the inner diameter of the outer pipe 100. By this arrangement a compartment 111 (see FIGS. 4*a*, 4*c*) is defined between the two surfaces. The warm, dry air 10 from the heat pump condenser unit 2 (not shown) is introduced into the said space 111 between the outer pipe 100 and the chamber 102 by pipes extending from the manifold 104 through the outer pipe 100. By this arrangement the warm, dry 10 air is distributed along the whole length of the drying unit before entering the drying chamber 102 through the perforated side wall.

An inner chamber 105 is coaxially arranged inside the drying chamber 102. The air flowing through the loose bulk material is sucked into the inner chamber 105, by at least one pipe 112, arranged for collecting and discharging the moist air. The inner chamber 105 is stationary, and has perforated or at least partly perforated side wall, to allow the humid air, i.e. the air which has passed through the loose bulk material, to pass through the side wall and into the inner chamber 105. The at least one pipe 112 for collecting and discharging the moist airflow extends through the end wall 107, and is connected to the heat exchanger unit 4 (not shown) downstream the drying unit 103.

The outer pipe 100 is preferably thermally insulated to reduce heat loss to the surroundings during the drying process. The outer pipe 100 may be a sandwich composite material with insulation, e.g. 5 cm insulation. The outer pipe 100 may further be divided in a number, i.e. two or more, of sections 100', 100", 100'", 100"". The length of each section may e.g. be 1-3 meters, e.g. 2-3 m. In a specific embodiment, shown in FIGS. 3 and 4, the outer pipe 100 is divided in four sections, the length of each section is about 2.5 m and the inner diameter of the outer pipe 100 is about 3 m. In the said embodiment the diameter of chamber 102 is about 2.8 m, resulting in about 10 cm gap defining the compartment 111 to which the warm dry air 10 is introduced. The diameter of the inner chamber 105 is about 1.2 m. The segmented pipe sections 100', 100", etc. may comprise inward protruding flange joints, dividing the compartment 111 surrounding the drying chamber 102, defining an equal number of compartment volumes 111', 111", 111''', 111'''' for the warm, dry air introduced in the drying unit. It should be noted that the dimensions of the drying unit according to this embodiment may be designed and adapted depending of desired capacity/volume. If a larger capacity is desired the drying unit 103 may be expanded by providing more sections, and the opposite in the case of smaller volumes.

In the embodiment shown in FIGS. 3a-b and 4a-c the air 10 from the heat pump condenser unit 2 is introduced via four pipes extending from the manifold 104 per section 100',100", etc., two at each side, through the insulated composite material outer pipe 100 sections. The inner chamber 105, shown in the embodiment, is also divided in four inner chamber sections 105', 105", 105''', 105'''', correspondingly to the outer pipe 100 sections. However, the number of outer pipe sections and inner chamber sections may differ. The inner chamber 105 is stationary and each of the four sections is provided with a pipe 112', 112", 112''', 112'''' for collecting and discharging the moist air. The said pipes for collecting the moist air extends through the end wall 107 and are further connected to the heat exchanger 4.

The drying unit 103 in the embodiment shown in FIGS. 3 and 4 is arranged in a framework structure 106. The drying unit 103 may be tilted, e.g. 15-30°, by elevating one end. Tilting the drying unit 103, by lifting the end 107 provided with a filling opening/hatch 109, facilitates filling of loose bulk material into the drying unit. The loose bulk material is distributed throughout the holding chamber 102 by gravity forces and by rotating the drum/chamber 102. Emptying the drying unit 103 may also be facilitated by tilting the drying unit 103 causing the material to be discharged through the opening/hatch 110 in the end wall 108 by gravity forces and rotating the chamber 102.

The present drying process may be continuous, semi-continuous or a batch process. The loose bulk material may be transported by using transport belts (not shown). The loose material to be dried may be contained in silos/hoppers arranged such that the charging into the drying unit is possible by gravitational forces. In order to automate the drying process the drying chamber may be equipped with sensors measuring temperature and/or relative humidity. As the drying process is in progress the relative moisture in the drying chamber decreases and the temperature increases, and by monitoring these parameters the drying process may be automated.

The drying system according to the present invention may be used for drying materials in granular or particular form or masses of relatively small solids. The drying system according to the invention may be used for drying
grains, such as wheat, malt, maize, rice, barley, oats, rye, sorghum, soybeans, etc.,
wood chips, and
agricultural products like fruits which must be dried during processing.

The drying system according to the present invention may also be used for drying single piece products, such as fish products, meat products, vegetables or fruits, wood products, marine products and the like.

In the following tests using the drying system according to the present invention is described.

Drying of Wood Chips.

In a test system for drying wood chips the drying unit 3 (see FIG. 1) comprised a base 5 defining a volume of about 1.6 m$^3$, to which the warm dry 10 air was introduced. The base 5 provided support for a drying bin 6 containing the wood chips, having a volume of about 4.8 m$^3$. The bottom/floor of the drying bin was a perforated steel plate 23 allowing the drying air, introduced into the base 5 below the perforated floor, to be distributed through the perforated plate and through the wood chips contained in the bin 6. The steel plate 23 was densely perforated with 5 mm diameter holes. In the upper part of the drying unit 3 a hood 7 was arranged. The hood was provided with a hole for discharging the moist air, guiding the said moist air to the heat exchanger via conduits. In the hood a screen 20 was arranged to prevent small particles to escape with the airflow. The system also comprised a fan 24 for the possibility to directly discharge the airflow from the dryer unit 3 into the surroundings.

A Panasonic CS-NE9PKE heat pump and a Covent type CKAA01 (heat exchanger) provided with a fan were used in the test. The indoor heat pump unit and the heat exchanger were placed in cabinets with tight connections to the air channels. The air was transported through the system in non-insulated conventional air channels, diameter 315 mm. The heat pump outdoor unit was also partly built in, with an opening allowing air to enter the system.

Different types of wood chips were used in the tests. In Table 1 the types of wood chips, the initial moisture content in the wood chips before drying and moisture content after drying is shown.

TABLE 1

| Type of wood chips | Initial moisture (%) | Final moisture (%) | Hours (t) |
|---|---|---|---|
| Broad-leaved trees/hardwood (whole tree) | 53.4 | 6.2 | 240 |
| Moist stored chips (stock/trunk) | 52.9 | 6.4 | 189 |
| Winter felled spruce chips (stock/trunk) | 52.3 | 6.3 | 131 |
| Winter felled spruce chips (stock/trunk) | 49.7 | 18.1 | 104 |

Figure 5:
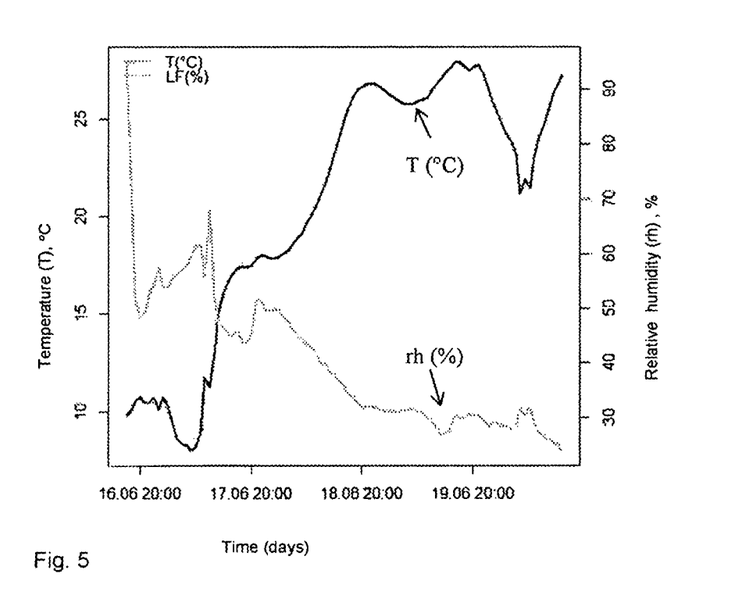
FIG. 5 shows measurements of temperature and relative humidity during drying of wood chips using the drying system according to the present invention.

Temperature and relative moisture in the drying bin was monitored during the tests by using EL-USB-1 from Lascar electronics. FIG. 5 shows the variations in temperature and relative humidity in the drying chamber (about 20 cm above the floor) during the drying process of the winter felled spruce chips with initial moisture 49.7% (see Table 1). To quantify the moisture content in the wood chips, samples of wood chips were collected and stored in sealed bags at the start of the tests and by the end of the tests. The samples were weighed immediately after sampling. The samples were placed in an oven with controlled temperature at 105±2° C. for drying. This drying method results in a moisture content approximating 0%. After the complete drying the wood chips were weighted, and the total moisture content in the samples were determined by using the methods according to the standard NS-EN 14774-2:2009. The energy content in the chips is calculated according to NS-EN ISO 17225-1:2014. The amount of power supplied to the heat pump and heat exchanger was also measured.

The results from the tests showed an initial average net calorific value (heating value) of 2.3 kWh per kg wood chips. Average net calorific value (heating value) after drying using the test system was 4.2 kWh per kg wood chips. The energy content increased in average about 14%.

Drying of Salted Cod. (Klipfish)

The conventional method for drying salted cod is with the aid of electric heaters or oil heater and fan or propeller. The salted cod is contained in a long drying house, normally 15-30 meters in length, 3-6 meters width and about 2 meter high. In modern dryers air dehumidifiers are used. Normal drying time is 7-12 days. The dried cod should have between 30-45% humidity after drying, depending of usage and market.

In the present test salted cod was dried using the drying system according to the present invention. The drying chamber was divided in 9 rooms in which the fish was placed on mesh trays, the capacity of salted cod corresponded to a 14 meters traditional salted cod dryer. The drying air flowed successively through the rooms in a labyrinth manner, from bottom to top. A conventional (domestic) heat pump was used, and the heat exchanger was provided with a fan, sucking surrounding air into the outdoor part of the heat pump and through the dryer, as previously described. The sucking fan created a underpressure in the system, which is observed to enhance the drying process.

FIGS. 6a-6d shows measured temperatures and relative humidity during the test at different places in the system. The dew point temperature is also shown in each figure. It is important that the temperature in the drying unit is higher than the dew point to avoid condensing of moisture on the products.

Figure 6A:
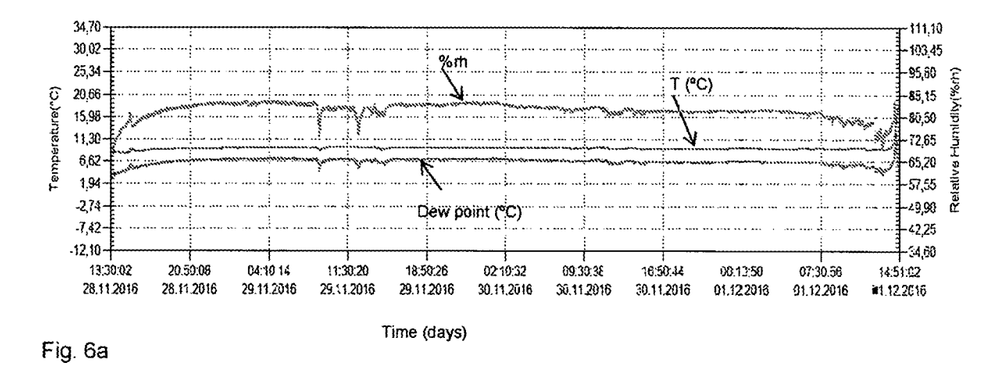
FIG. 6a-6d shows measurements of temperature and relative humidity during drying of salted cod (klipfish) using the drying system according to the present invention.

In FIG. 6a the measurements are made in the room in which the drying system was placed, i.e. surrounding air.

Figure 6B:
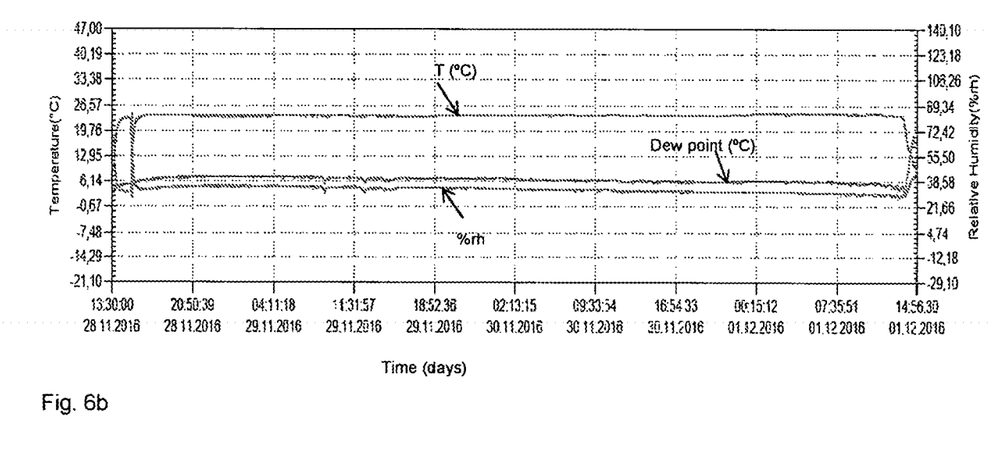

In FIG. 6h the measurements show the temperature and relative humidity of the air leaving the heat pump indoor unit (i.e. the healing unit). Thus, this was temperature and relative humidity of the air that entered the drying chamber.

Figure 6C:
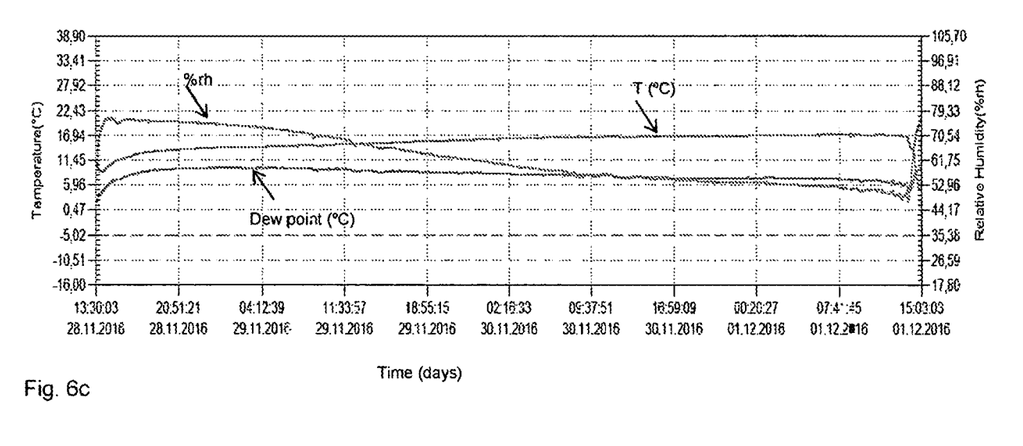

FIG. 6c shows temperature and relative humidity measured in the last room with mesh trays holding salted cod (thus, after the air had passed all trays with salted cod).

Figure 6D:
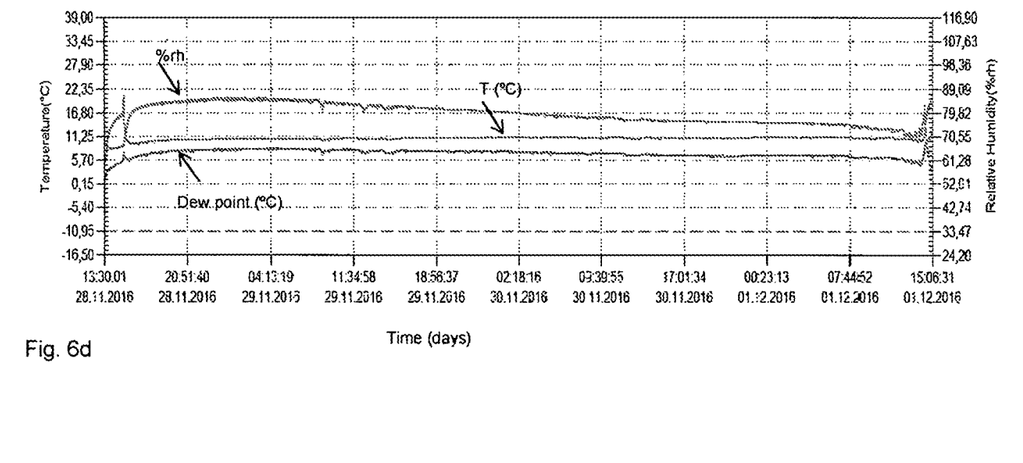

FIG. 6d shows the temperature and relative humidity of the air after passage through the heat exchanger (thus, heat exchanged by preheating the cold, dry air entering the system). About 85% of the heat was recovered in the heat exchanger.

The temperature of the surrounding air, thus the air entering the outdoor heat pump unit was about 9° C., the relative humidity was about 85%. The temperature of the cold, dry air was lifted to about 22° C. by the heat pump, i.e. the temperature air entering the drying chamber. The relative humidity of the warmed air was just below 30%. When drying such fish products the drying temperature must not be too high, i.e. above 23° C., as temperatures above this will destroy the products.

It is seen that the temperature of the drying air in the last room in the drying chamber was relatively low when the measurements started, further the relative humidity was relatively high. As the drying process progressed the temperature rose and the relative humidity decreased. The drying was finished after 3 days.

The results of the tests of drying salted cod showed a very effective drying process with 50-80% reduction of power consumption compared with conventional dryers. Also the drying time was reduced by at least 50%, still meeting all quality requirements, or even better quality results.

Compared with a modern conventional dryer including a dehumidifier, the present system resulted in 25-50% reduction of power consumption and complete drying process after only half the normal time. The drying system also allows designing a more compact drying chamber Although the present test systems were used for drying wood chips and fish products, these should not be considered as a limitation of the invention. These and other examples of the invention illustrated above and in the accompanying drawings are intended by way of example only, and the actual scope of the invention is to be determined from the following claims.

The invention claimed is:

1. A drying system for lowering the moisture content in materials, comprising
   an air inlet, a heat pump evaporator unit, a heat pump condenser unit, a drying unit, a heat exchanger unit, a fan, and air channels for closed transport of airflow from the air inlet through the system, wherein
   the fan causes air to flow into the air inlet through the heat pump evaporator unit and to maintain an airflow through the system;
   the heat pump evaporator unit is at least partly encased, wherein the heat pump evaporator unit is configured to produce a cold and dehumidified air flow by absorbing heat, via a refrigerant, from at least a portion of the airflow that flows into the system through the heat pump evaporator;
   the heat pump condenser unit is encased defining a volume, through which the air flows, wherein the refrigerant releases the heat absorbed at the evaporator to the airflow, producing a dry, heated airflow which is introduced into the drying unit;
   the drying unit comprises:
      a stationary outer pipe comprising a first end wall and a second end wall, at least one of the said end walls is provided with an opening for charging the material, and at least one opening in the outer pipe side wall for supplying the dry, heated airflow,
      a rotatable drying chamber coaxially arranged inside the outer pipe, having a smaller diameter than the inner diameter of the outer pipe, and the side wall of the drying chamber is at least partially perforated, wherein the space defined between the inner side wall of the outer pipe and the drying chamber defines at least one compartment for receiving and distributing the dry, heated airflow,
      an inner chamber coaxially arranged inside the said drying chamber, the inner chamber has at least one opening in the side wall, for receiving the airflow from the drying chamber, and discharging, the airflow via at least one pipe arranged in one of the end walls of the outer pipe; and
   the heat exchanger unit is configured to transfer heat from the airflow leaving the drying unit to the cold, dehumidified air flowing from the heat pump evaporator unit.

2. The system according to claim 1, where the outer pipe is divided in two or more sections, dividing the at least one compartment into an equal number of volumes, wherein each section comprises at least one inlet for drying an airflow.

3. The system according to claim 2, wherein the inner chamber is divided into two or more inner chamber sections via partition walls, and further comprising chamber pipes for discharging the airflow that extends from each of the two or more inner chamber sections through one of the end walls of the outer pipe.

4. The system according to claim 1, where the drying unit is configured to be tilted by elevating one end.

5. The system according to claim 1, where the drying unit is equipped with sensors for measuring at least one of a temperature or relative humidity or the air.

6. Use of a drying system according to claim 1, for lowering the moisture content in loose bulk materials and/or single piece materials.

7. A system according to claim 1, wherein the airflow which has passed through the heat exchanger downstream the drying unit is discharged to an area surrounding the system.

8. A system according to claim 1, where the temperature of the airflow entering the drying unit is up to about 35 degrees Celsius.

9. A drying unit for drying material by using an airflow, comprising:
- an outer pipe comprising a first end wall and a second end wall, wherein at least one of the end walls is provided with an opening for charging material, and at least one opening in the outer pipe side wall is configured to supply drying air;
- a rotatable drying chamber coaxially arranged inside the outer pipe having a smaller diameter than the inner diameter of the outer pipe, wherein the drying chamber side wall is at least partially perforated, and
- the space defined between the inner side wall of the outer pipe and the drying chamber defines a compartment for receiving and distributing the drying air, and
- an inner chamber coaxially arranged inside the drying chamber, wherein the inner chamber has at least one opening in the side wall for receiving air from the drying chamber and discharging the airflow via at least one pipe arranged in one of the end walls of the outer pipe.

10. The drying unit according to claim 9, where the outer pipe is divided resulting in at least least two sections dividing the compartment into an equal number of spaces, each section having at least one inlet for drying air.

11. The drying unit according to claim 9, where the inner chamber is divided into at least two inner chamber sections via partition walls, and further comprising chamber pipes for discharging the airflow that extends from the at least two inner chamber sections through one of the end walls of the outer pipe.

12. The drying unit according to claim 9, where the drying unit is arranged in a frame structure with an elevating member for elevating one end.

13. The drying unit according to claim 9, where the drying unit is equipped with sensors for measuring at least one of a temperature or relative humidity or the air.

14. A process for lowering the moisture content in a material, comprising:
- providing, by a fan, an airflow into an air inlet to an air channel in a closed transport drying system;
- passing the airflow through a heat pump evaporator unit that is at least partially encased and that contains a refrigerant, wherein the refrigerant absorbs heat from at least a portion of the airflow, thereby producing a cold, dry airflow;
- passing on the cold, dry airflow from the heat pump evaporator unit to a heat exchanger unit, and further to a heat pump condenser unit that is encased so as to define a volume, wherein the heat pump condenser unit releases the heat absorbed by the refrigerant to the cold, dry airflow, thereby producing a heated, dry airflow;
- passing on the heated, dry airflow to a drying unit containing the material to be dried, wherein the drying unit comprises:
  - a stationary outer pipe comprising a first end wall and a second end wall, at least one of the said end walls is provided with an opening for charging the material, and at least one opening in the outer pipe side wall for supplying the heated, dry airflow;
  - a rotatable drying chamber coaxially arranged inside the outer pipe, having a smaller diameter than the inner diameter of the outer pipe, wherein a side wall of the drying chamber is at least partially perforated;
  - wherein a space defined between an inner side wall of the outer pipe and the drying chamber defines at least one compartment for receiving and distributing the heated, dry airflow;
  - an inner chamber coaxially arranged inside the drying chamber, the inner chamber having at least one opening in a side wall for receiving the airflow from the drying chamber and discharging the airflow via at least one pipe arranged in one of the end walls of the outer pipe; and
- passing on the airflow from the drying unit to the heat exchanger, thereby transferring heat to the cold, dry airflow.

15. A process according to claim 14, wherein the process is a continuous process.

16. A process according to claim 14, wherein the process is a semi-continuous process.

17. A process according to claim 14, wherein the process is a batch process.

* * * * *